(12) United States Patent
Ulrey et al.

(10) Patent No.: US 9,309,837 B2
(45) Date of Patent: Apr. 12, 2016

(54) METHODS AND SYSTEMS FOR EGR CONTROL

(71) Applicant: Ford Global Technologies, LLC, Dearborn, MI (US)

(72) Inventors: Joseph Norman Ulrey, Dearborn, MI (US); Gregory Patrick McConville, Ann Arbor, MI (US); Daniel Joseph Styles, Canton, MI (US); Ross Dykstra Pursifull, Dearborn, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 13/966,006

(22) Filed: Aug. 13, 2013

(65) Prior Publication Data
US 2015/0047618 A1 Feb. 19, 2015

(51) Int. Cl.
*F02M 25/07* (2006.01)
*F02D 41/00* (2006.01)

(52) U.S. Cl.
CPC .......... *F02M 25/07* (2013.01); *F02D 41/0007* (2013.01); *F02D 41/0065* (2013.01); *F02M 25/0709* (2013.01); *F02M 25/0722* (2013.01); *F02M 25/0727* (2013.01)

(58) Field of Classification Search
CPC .... F02B 47/08; F02M 25/07; F02M 25/0706; F02M 25/0709; F02M 25/0713; F02M 25/0722
See application file for complete search history.

(56) References Cited

U.S. PATENT DOCUMENTS

| 3,614,259 | A  | 10/1971 | Neff |
| 4,351,154 | A  | 9/1982  | Richter |
| 4,389,845 | A  | 6/1983  | Koike |
| 4,443,153 | A  | 4/1984  | Dibelius |
| 4,544,326 | A  | 10/1985 | Nishiguchi et al. |
| 4,949,276 | A  | 8/1990  | Staroselsky et al. |
| 6,079,210 | A  | 6/2000  | Pintauro et al. |
| 6,408,833 | B1 | 6/2002  | Faletti |
| 6,565,479 | B2 | 5/2003  | Fattic et al. |
| 6,681,171 | B2 | 1/2004  | Rimnac et al. |

(Continued)

FOREIGN PATENT DOCUMENTS

| EP | 0435357 A1 | 7/1991 |
| EP | 2317111 A1 | 5/2001 |

(Continued)

OTHER PUBLICATIONS

Ulrey, Joseph Norman et al., "Methods and Systems for Boost Control," U.S. Appl. No. 13/965,901, filed Aug. 13, 2013, 54 pages.

(Continued)

*Primary Examiner* — Lindsay Low
*Assistant Examiner* — Jacob Amick
(74) *Attorney, Agent, or Firm* — Julia Voutyras; Alleman Hall McCoy Russell & Tuttle LLP

(57) ABSTRACT

Methods and systems are provided for using compressor recirculation flow via a venturi to enhance low pressure EGR flow. The opening of a compressor recirculation valve can be adjusted based on EGR flow demand to recirculate cooled compressed air through a venturi while generating vacuum for drawing EGR. The approach allows for concurrent EGR control and surge control.

20 Claims, 7 Drawing Sheets

(56) References Cited

U.S. PATENT DOCUMENTS

| | | | |
|---|---|---|---|
| 6,725,847 | B2 | 4/2004 | Brunemann et al. |
| 6,983,596 | B2 | 1/2006 | Frankenstein et al. |
| 7,137,253 | B2 | 11/2006 | Furman et al. |
| 7,163,005 | B2 | 1/2007 | Tussing et al. |
| 7,640,744 | B2 | 1/2010 | Rollinger et al. |
| 8,161,746 | B2 | 4/2012 | Ulrey et al. |
| 8,267,069 | B2 | 9/2012 | Hsia et al. |
| 8,286,616 | B2 | 10/2012 | Clarke et al. |
| 8,287,233 | B2 | 10/2012 | Chen |
| 8,333,071 | B2 | 12/2012 | Oakley et al. |
| 2006/0060172 | A1* | 3/2006 | Liu .................... F02M 25/0722 123/568.17 |
| 2006/0196182 | A1 | 9/2006 | Kimoto et al. |
| 2008/0163855 | A1 | 7/2008 | Matthews et al. |
| 2009/0071150 | A1 | 3/2009 | Joergl et al. |
| 2010/0300088 | A1* | 12/2010 | Joergl et al. ..................... 60/602 |
| 2011/0023842 | A1 | 2/2011 | Kurtz |
| 2011/0094480 | A1 | 4/2011 | Suhocki et al. |
| 2011/0132331 | A1* | 6/2011 | Pursifull ...................... 123/478 |
| 2012/0014812 | A1 | 1/2012 | Blaiklock et al. |
| 2012/0297765 | A1 | 11/2012 | Vigild et al. |

FOREIGN PATENT DOCUMENTS

| | | | |
|---|---|---|---|
| EP | 1124047 | A1 | 8/2001 |
| EP | 2426340 | A1 | 3/2012 |
| EP | 2562397 | A1 | 8/2012 |

OTHER PUBLICATIONS

Banker, Adam Nathan et al., "Methods and Systems for Torque Control," U.S. Appl. No. 13/965,917, filed Aug. 13, 2013, 46 pages.

McConville, Gregory Patrick et al., "Methods and Systems for Boost Control," U.S. Appl. No. 13/965,938, filed Aug. 13, 2013, 40 pages.

Ulrey, Joseph Norman et al., "Methods and Systems for Boost Control," U.S. Appl. No. 13/965,952, filed Aug. 13, 2013, 40 pages.

Jankovic, Mrdjan J. et al., "Methods and Systems for Boost Control," U.S. Appl. No. 13/829,648, filed Mar. 14, 2013, 39 pages.

Styles, Daniel Joseph et al., "Methods and Systems for Boost Control," U.S. Appl. No. 13/965,698, filed Aug. 13, 2013, 43 pages.

Buckland Julia Helen et al., "Methods and Systems for Surge Control," U.S. Appl. No. 113/965,725, filed Aug. 13, 2013, 38 pages.

Ulrey, Joseph Norman et al., "Methods and Systems for Condensation Control," U.S. Appl. No. 13/965,751, filed Aug. 13, 2013, 36 pages.

Ulrey, Joseph Norman et al., "Methods and Systems for Condensation Control," U.S. Appl. No. 13/965,763, filed Aug. 13, 2013, 37 pages.

McConville, Gregory Patrick et al., "Methods and Systems for Boost Control," U.S. Appl. No. 13/965,963, filed Aug. 13, 2013, 45 pages.

Ulrey, Joseph Norman et al., "Methods and Systems for EGR Control," U.S. Appl. No. 13/965,794, filed Aug. 13, 2013, 56 pages.

Byrd, Kevin Durand et al., "Multi-Staged Wastegate," U.S. Appl. No. 13/570,025, filed Aug. 8, 2012, 26 pages.

Ulrey, Joseph Norman et al., "Method and System for Fuel Vapor Management," U.S. Appl. No. 13/660,884, filed Oct. 25, 2012, 38 pages.

* cited by examiner

METHODS AND SYSTEMS FOR EGR CONTROL

FIELD

The present application relates to methods and systems for drawing in EGR through a compressor recirculation path including a venturi.

BACKGROUND AND SUMMARY

Engine systems may be configured with a boosting device, such as a turbocharger, for providing a boosted aircharge and improving peak power outputs. Therein a turbine is rotated using energy from an exhaust flow, the turbine then driving a compressor which delivers a boosted aircharge to the engine intake. To improve exhaust emissions, engine systems may also be configured with exhaust gas recirculation (EGR) systems wherein at least a portion of the exhaust gas is recirculated to the engine intake. For example, the EGR system may be a low-pressure EGR system (LP-EGR) that recirculates exhaust gas from downstream of an exhaust turbine to upstream of an intake compressor. EGR benefits include an increase in engine dilution, decrease in exhaust emissions, and improvements in fuel economy, especially at higher levels of engine boost.

Introduction of (low pressure) EGR upstream of the compressor requires the compressor inlet pressure to be reduced, so that the EGR can be pulled in from the engine exhaust system, downstream of the turbine. The low pressure at the compressor inlet generates a pressure differential across the EGR passage that enables the desired EGR flow to be drawn in. The low compressor inlet pressure may be achieved by throttling the compressor inlet with an additional throttle known as the air intake system (AIS) throttle. One example of such a system using multiple throttles is shown by Ulrey et al. in U.S. Pat. No. 8,161,746. However, the inventors herein have recognized potential issues with such an approach. As one example, the low pressure at the compressor inlet increases the potential for compressor surge. In addition, durability concerns may be raised if oil from the turbocharger shaft seal is pulled into the turbocharger. Further still, the need for an additional throttle increases component cost as well as complexity in coordinating the control of the additional throttle with the main intake throttle.

In one example, some of the above issues may be addressed by a method for an engine comprising: recirculating an amount of compressed air from downstream of a charge air cooler to a compressor inlet via a venturi, and using vacuum generated at the venturi to draw EGR into the compressor inlet. In this way, recirculation flow through a venturi can be advantageously used to generate vacuum for drawing in EGR at a pre-compressor location while also addressing surge.

For example, an engine system may be configured with a compressor recirculation passage that recirculates cooled compressed air from downstream of a charge air cooler to a compressor inlet via a continuously variable compressor recirculation valve (CRV). A venturi may be positioned in the compressor recirculation passage downstream of the CRV such that compressed air is recirculated to the compressor inlet upon flowing through the venturi, the flow generating a vacuum at the venturi. An EGR passage including a continuously variable EGR valve for recirculating exhaust residuals from the engine exhaust to the compressor inlet may be coupled to the compressor recirculation passage at the venturi. An opening of the CRV may be adjusted to provide a margin to surge. The vacuum generated by the surge mitigating compressor recirculation flow may be advantageously used to enhance the pressure differential in the EGR passage. An opening of the EGR valve may then be adjusted based on the opening of the CRV (or the venturi vacuum level) to meet the EGR flow demand. For example, as the venturi vacuum available from the compressor recirculation flow increases, a smaller EGR valve opening may be required to meet the EGR flow demand.

In this way, EGR flow can be enhanced using vacuum induced using compressor recirculation flow. By drawing in the EGR to the compressor inlet using assistance from venturi vacuum, the need for pre-compressor throttling, including the need for a dedicated throttle is reduced. By enabling EGR to be drawn in without reducing the pressure at the compressor inlet, a margin to surge is also improved. By using compressor recirculation flow to assist in drawing in EGR, surge control and EGR control are concurrently achieved. Overall EGR benefits can be provided over a larger engine operating window while boosted engine performance is also improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
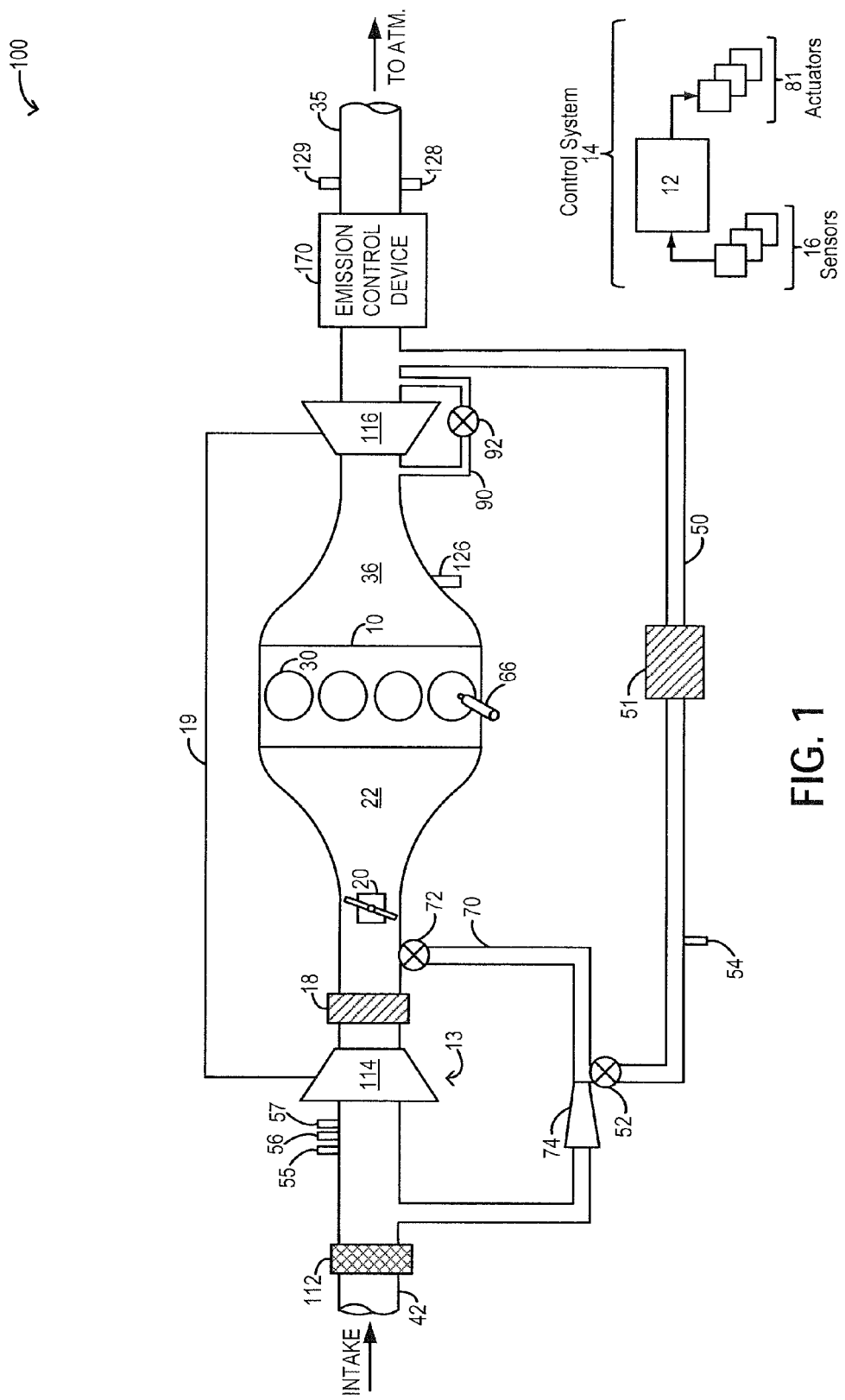
FIGS. 1-2 show example embodiments of a boosted engine system.
Figure 2:
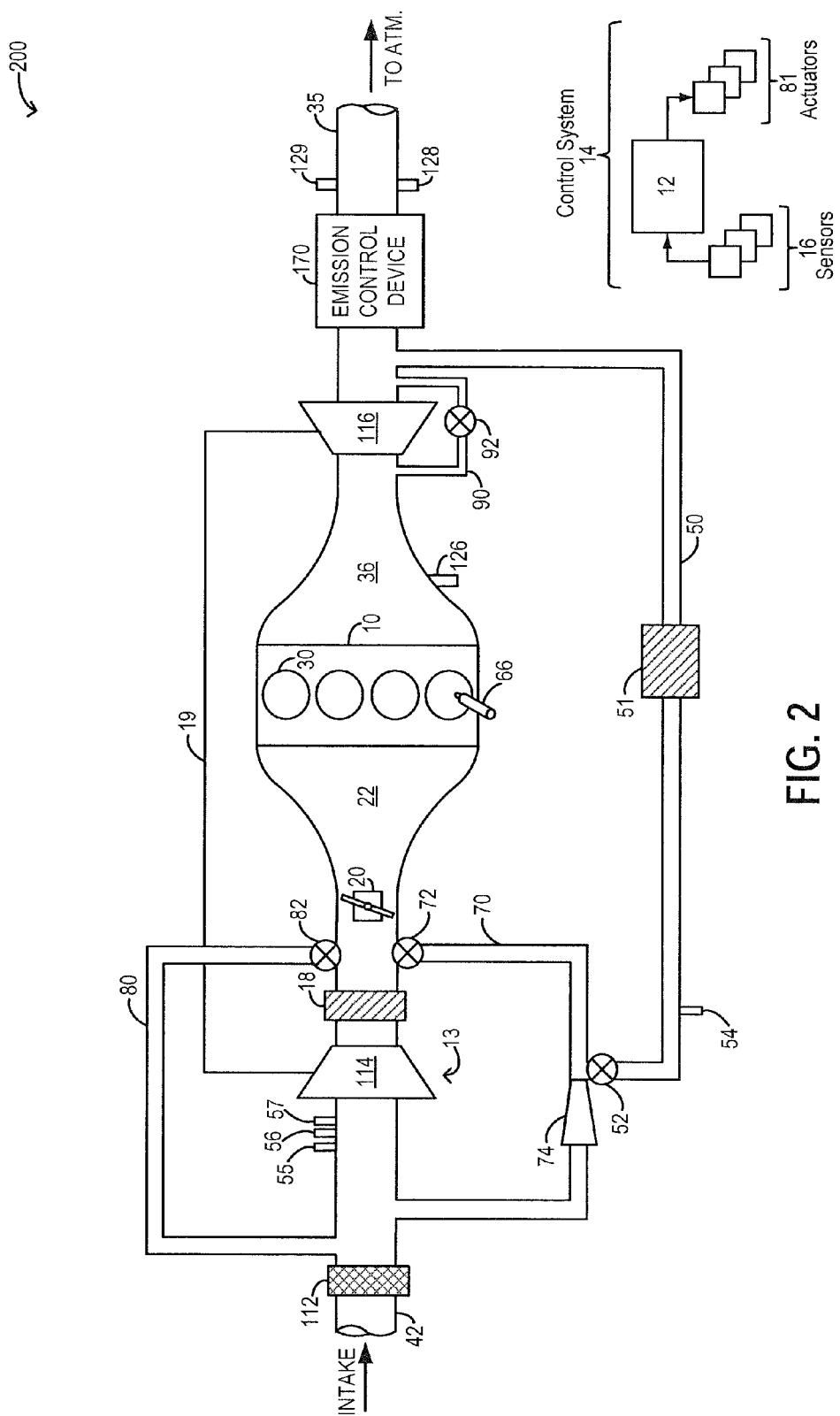

The following description relates to systems and methods for using compressor recirculation flow to draw in low pressure EGR into an engine system, such as the system of FIGS. 1-2. A controller may be configured to perform a control routine, such as the routine of FIGS. 4-5, to adjust an amount of cooled compressor recirculation flow directed from downstream of a charge air cooler to a compressor inlet via a venturi (FIG. 3) based on a desired EGR rate. By flowing the compressor recirculation flow through the venturi, a vacuum can be generated at the venturi's neck. The generated vacuum can then be used to enhance EGR flow drawn in from an EGR passage coupled to the compressor recirculation path at the venturi. An example compressor recirculation flow adjustment that may be used to draw in EGR are shown with reference to FIGS. 6-7. In this way, a carbureted flow of EGR can be provided while improving the margin to surge.

FIGS. 1-2 depict example embodiments of an engine system configured with each of a compressor recirculation flow system and an EGR system. It will be appreciated that components introduced in FIG. 1 may be numbered similarly in FIG. 2 and not re-introduced. Turning first to FIG. 1, it schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 114 is coupled, through charge-air cooler (CAC) 18 (herein also referred to as an intercooler) to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 124. Since flow through the compressor can heat the compressed air, a downstream CAC 18 is provided so that boosted intake aircharge can be cooled prior to delivery to the engine intake.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when EGR is enabled, the sensors may estimate a temperature, pressure, humidity, and air-fuel ratio of the air-charge mixture including fresh air, recirculated compressed air, and exhaust residuals received at the compressor inlet.

During selected conditions, such as during a tip-out, when going from engine operation with boost to engine operation without boost, compressor surge can occur. This is due to an increased pressure differential being generated across the compressor when the throttle closes at the tip-out. The increased pressure differential reduces forward flow through the compressor, causing surge and degraded turbocharger performance. In addition, surge can lead to NVH issues such as undesirable noise from the engine intake system. To relieve boost pressure and reduce compressor surge, at least a portion of the aircharge compressed by compressor 114 may be recirculated to the compressor inlet. This allows excess boost pressure to be substantially immediately relieved. The compressor recirculation system may include a compressor recirculation passage 70 for recirculating cooled compressed air from the compressor outlet, downstream of charge-air cooler 18 to the compressor inlet.

In some embodiments, an additional compressor recirculation passage (not shown) may be provided for recirculating un-cooled (or warm) compressed air from the compressor outlet, upstream of charge-air cooler 18 to the compressor inlet. Further still, as discussed with reference to FIG. 2 below, in addition to (first) compressor recirculation passage 70, a second compressor recirculation passage may be provided for also recirculating cooled compressed air from downstream of CAC 18 to the compressor inlet. When both cool compressed air recirculation paths are provided, one may be used for EGR control while the other is used for boost or surge control, as elaborated below.

A compressor recirculation valve (CRV) 72 may be coupled to compressor recirculation passage 70 to control an amount of cooled compressor flow recirculated to the compressor inlet. In the depicted example, CRV 72 may be configured as a continuously variable valve wherein a position of the valve is continuously variable from a fully closed position to a fully open position and any position there-between. CRV 72 may be positioned in passage 70, downstream of CAC 18 and upstream of an inlet of venturi 74 (e.g., at the junction of passage 70 and outlet of CAC 18). A position of CRV 72 may be adjusted during boosted engine operation to improve peak performance and provide a margin to surge. In one example, the CRV may be maintained closed during boosted engine operation to improve boost response and peak performance. In another example, the CRV may be maintained partially open during boosted engine operation so as to provide some surge margin, in particular, an improved margin to soft surge. In either case, in response to an indication of surge (e.g., hard surge), the opening of the valve may be increased. A degree of opening of the CRV may be based on the indication of surge (e.g., the compressor ratio, the compressor flow rate, a pressure differential across the compressor, etc.). As one example, an opening of the CRV may be increased (e.g., the valve may be shifted from the fully-closed position or partially-open position to a fully-open position) in response to an indication of surge.

A venturi 74 may be coupled to compressor recirculation passage 70, downstream of the charge air cooler outlet and downstream of compressor recirculation valve 72. Thus compressor recirculation flow may be directed through the venturi. By adjusting the opening of CRV 72, a variable amount of compressor recirculation flow may be directed from the charge air cooler to the compressor inlet via venturi 74. In alternate embodiments, an aspirator or ejector may be used. A detailed embodiment of venturi 74 is provided at FIG. 3. As such, due to the specific tapering of the venturi, a flow restriction is provided at a neck of the venturi which causes a "venturi effect" (or "Bernoulli effect"). Thus, compressor recirculation flow passing through the venturi may generate a lower pressure region (or vacuum) at the neck of the venturi. This vacuum can be advantageously used to draw EGR into the compressor inlet, and then into the engine, thereby enhancing EGR flow, as discussed below.

Surge may also be relieved by reducing exhaust pressure at turbine 116. For example, a wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge. However, due to the boost dynamics of the wastegate, the effects of compressor recirculation valve adjustments on reducing surge may be faster than the effects of the wastegate adjustments.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, a portion of the exhaust residuals may be diverted instead to EGR passage 50, through EGR cooler 51 and EGR valve 52, to the inlet of compressor 114. EGR valve 52 may be opened to admit a controlled amount of cooled exhaust gas to the compressor inlet for desirable combustion and emissions-control performance. In this way, engine system 10 is adapted to provide external, low-pressure (LP) EGR by tapping exhaust gas from downstream of turbine 116. EGR valve 52 may be configured as a continuously variable valve, in the embodiment of FIG. 1. In an alternate example, such as in the embodiment of EGR valve 52 in FIG. 2, the valve may be configured as an on/off valve. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

EGR cooler 51 may be coupled to EGR passage 50 for cooling EGR delivered to the compressor. In addition, one or more sensors may be coupled to EGR passage 50 for providing details regarding the composition and condition of the EGR. For example, a temperature sensor may be provided for determining a temperature of the EGR, a pressure sensor may be provided for determining a temperature of the EGR, a humidity sensor may be provided for determining a humidity or water content of the EGR, and an air-fuel ratio sensor 54 may be provided for estimating an air-fuel ratio of the EGR. Alternatively, EGR conditions may be inferred by the one or more temperature, pressure, humidity and air-fuel ratio sensors 55-57 coupled to the compressor inlet. An opening of the EGR valve may be adjusted based on the engine operating conditions and the EGR conditions to provide a desired amount of engine dilution. In one example, EGR valve 52 may also be configured as a continuously variable valve. Alternatively, as depicted, EGR valve 52 may be an on/off valve.

In the depicted embodiment, EGR passage 50 is coupled to (or merges with) compressor recirculation passage 70 at a location upstream venturi 74. Specifically, an outlet of EGR passage 50 is coupled immediately upstream of an inlet of venturi 74. In one example, EGR valve 52 may be mounted on venturi 74. This provides multiple advantages. First, compressor recirculation flow through venturi 74 can be used to draw a vacuum at the neck of venturi 74 and the drawn vacuum can be used to enhance the drawing of EGR from the EGR passage towards the compressor inlet. By using the vacuum generated at the venturi (via the compressor recirculation flow) to draw in the EGR, the need for actively reducing a compressor inlet pressure (e.g, via compressor inlet throttling) is reduced. This not only reduces the need for additional components, such as an additional pre-compressor throttle, but also synergistically reduces the occurrence of compressor surge (which can be induced by a sudden drop in compressor inlet pressure).

Further, by adjusting the amount of compressor recirculation flow, a vacuum generated at the venturi can be varied, thereby varying an amount of EGR drawn into the compressor recirculation passage and delivered to the compressor inlet. By coordinating the opening of the EGR valve with the opening of the CRV, a desired EGR rate can be provided. In other words, a metered control of the EGR rate is enabled.

As such, a pressure change at the venturi's neck can be determined as per relation (1):

$$\Delta P = V^2/2,$$

where V is the flow velocity of compressor recirculation flow through the venturi's neck.

The flow resistance (F) of the aspirated fluid (herein the low pressure EGR) relates to the pressure change as per relation (2):

$$\Delta P = k_1 F^2$$

Based on relations (1) and (2), it thus follows that $V^2/2 = k_1 F^2$. In other words, as the compressor recirculation flow directed through the venturi increases, the aspiration rate of EGR increases. Thus, by adjusting a compressor recirculation flow through the venturi, and adjusting the position of the EGR valve, an amount of EGR delivered to the engine intake can be varied. In addition, by mixing the EGR with the compressor recirculation flow in the compressor recirculation passage upstream of the compressor inlet, sufficient homogenization of the mixture can be ensured. In addition, sufficient EGR dilution can also be provided, if required.

A controller may adjust the position of CRV 72 during engine operation, based on engine operating conditions, to provide a desired amount of compressor recirculation flow that provides a desired throttle inlet pressure and that also limits surge. If EGR is desired, the controller may then determine a desired EGR flow (e.g., amount and/or rate of EGR) based on engine operating conditions. As such, the desired EGR flow can be provided by varying the exhaust pressure (which pushes the EGR into the EGR passage). A pressure differential (herein also referred to as delta P) across the EGR passage, that is, between the exhaust pressure near the inlet of the EGR passage and the intake pressure near the outlet of the EGR passage, may determine how much EGR can be provided, with EGR flow increased (for a given EGR valve opening) as delta P increases. The inventors herein have recognized that by flowing the existing compressor recirculation flow through the venturi, additional vacuum can be generated to enhance delta P and thereby assist in the drawing of the EGR. Specifically, by using the exhaust pressure from existing engine flow and the vacuum generated from the compressor recirculation flow, EGR can be flowed into the engine at the desired EGR rate by concurrently adjusting an opening of EGR valve 52 and CRV 72. The drawn EGR can be mixed with the compressor recirculation flow before being delivered to the compressor inlet. In this way, LP-EGR can be drawn into the engine intake using vacuum assistance advantageously generated from compressor recirculation flow.

In the embodiment of FIG. 1, in response to an indication of surge, an opening of CRV 72 is increased (e.g., shifted to a fully open position) to rapidly dump excess boost pressure upstream of the compressor, improving the forward flow through the compressor substantially immediately. Additionally, an opening of EGR valve 52 may be correspondingly decreased to enable EGR flow to be maintained.

During some engine operating conditions, the EGR requirements and the compressor recirculation flow requirements may be substantially different. For example, more compressor recirculation flow may be required (for example, to address surge) than EGR flow. If compressor recirculation flow were drawn through the venturi at a rate needed to address the surge, more EGR may be delivered to the engine intake than otherwise required, degrading engine combustion stability. On the other hand, if compressor recirculation flow were drawn through the venturi at the rate needed to provide the EGR, the margin to surge may reduce, degrading boost performance.

To address these conflicting needs, an alternate embodiment 200 of the engine system may be used, as shown at FIG. 2. Therein, two distinct compressor recirculation passages 70 and 80 are provided. The first and second passages may each couple the CAC outlet to the compressor inlet, and further, the passages may be positioned in parallel to each other. The first compressor recirculation passage 70 may include venturi 74 and may be coupled to the EGR passage 50, as described previously in FIG. 1, so as to provide EGR control. In comparison, the second compressor recirculation passage 80 may not include a venturi and may not be coupled to the EGR passage 50, so as to provide independent surge control. In the embodiment of FIG. 2, EGR valve 52 may be configured as an on/off valve. The opening of a first compressor recirculation valve 72 in first passage 70 may be adjusted to flow cooled compressed air through the venturi at a velocity that generates sufficient vacuum for drawing in EGR and assisting exhaust pressure in the delivery of EGR to the engine at a desired EGR rate. In comparison, the opening of a second valve 82 in second passage 80 may be adjusted based a boost demand of the engine and a surge limit of the compressor. This allows both EGR and the compressor to be controlled independently in the event of compressor surge.

A controller may determine a desired amount and/or rate of EGR based on engine operating conditions. If EGR is desired, EGR valve 52 may be shifted to an on position (that is, a fully open position). Based on the exhaust pressure available, the delta P required to provide the desired EGR flow may be determined. An opening of CRV 72 may then be adjusted based on the desired pressure differential so that sufficient vacuum is generated at the venturi. The vacuum is then used to draw in the EGR, which is then mixed with the compressor recirculation flow before being delivered to the compressor inlet. Concurrently, an opening of CRV 82 may be adjusted based on boost demand and surge margin so that a desired boost response can be provided. For example, the opening of CRV 82 may be increased to improve the margin to compressor surge while the opening of CRV 72 is maintained to provide the determined EGR flow. In this way, EGR control and boost control can be simultaneously provided using compressor recirculation flow through the two parallel compressor recirculation passages.

It will be appreciated that in some embodiments, the amount of compressor recirculation flow directed through the venturi may be further adjusted based on a water content or humidity of the LP-EGR. This is because EGR has relatively large water content and a relatively high dew point, rendering the LP-EGR provided to the engine intake at the pre-compressor location prone to condensation. In particular, based on EGR conditions, engine operating conditions, and a compressor inlet temperature at a time when the EGR is received, condensation can occur at both the compressor inlet as well as the charge air cooler outlet. For example, under cold ambient conditions, when the humid EGR is mixed with cold ambient intake air, water droplets can form. Water droplets impacting the compressor blades which are rotating at high speeds (e.g., 200,000 rpm or above) can cause damage to the blades. In addition, since the ingested water slows the rate of combustion, the introduction of water into the engine can increase the likelihood of misfire events. During such conditions, a controller may adjust (e.g., increase or decrease) the desired EGR rate based on condensation risk. For example, the compressor recirculation flow may be increased and/or the EGR valve opening may be increased to meet the reduced EGR demand. Herein, since the EGR flow is warmer than ambient air flow (due to inefficiencies at the CAC), enhancing EGR flow with the recirculation may raise the compressor inlet temperature of the air and EGR mixture received in the CAC, and thereby reduce condensation. In another example, the compressor recirculation flow may be decreased and/or the EGR valve opening may be decreased. This is because raising EGR rate may increase water vapor concentration as well as temperature, and in some ranges of EGR rate (typically 15-30% for gasoline engine) can even result in more condensation. Thus, the EGR rate can be adjusted in response to a condensation risk level.

Embodiments 100 and 200 of the engine system may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 126, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, compressor recirculation valve(s) 72, 82, wastegate actuator 92, and fuel injector 66. The control system 14 may include a controller 12. The controller may receive input data from the various sensors, process the input data, and trigger various actuators in response to the processed input data based on instruction or code programmed therein corresponding to one or more routines. Example control routines are described herein with regard to FIGS. 4-5.

Figure 3:
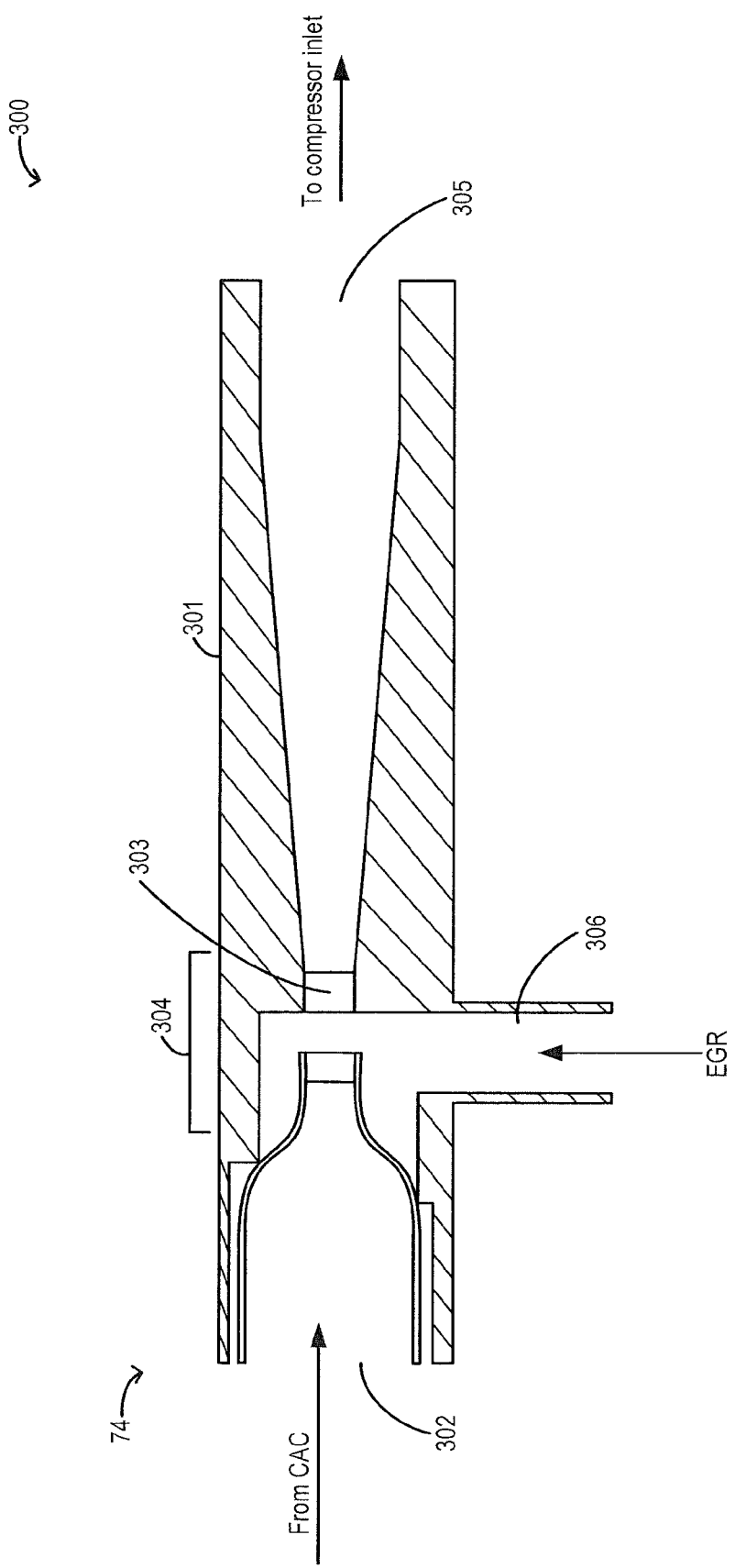
FIG. 3 shows an example embodiment of a venturi coupled to the compressor recirculation system of FIGS. 1-2.

Now turning to FIG. 3, an example embodiment 300 of venturi 74 of FIGS. 1-2 is shown. As such, the depicted embodiment is for a typical venturi/ejector commonly used to accelerate the flow (reduce the pressure), mix the two flow streams (motive recirculation flow and secondary flow which is EGR) and decelerate the flow to recover the dynamic pressure. It will be appreciated that the proportions and angles may vary with the pressures and flow rates of the primary and secondary flows.

Venturi 300 includes a horizontal passage 301 with a converging inlet 302 coupled to the intake passage and configured to receive cooled compressor recirculation flow from downstream of the charge air cooler. Horizontal passage 301 may be coupled to a compressor recirculation passage, such as passage 70 of FIGS. 1-2. Horizontal passage 301 further includes a diverging outlet 305 coupled to the intake passage and configured to direct a mixture of cooled compressor recirculation flow and EGR to the compressor inlet. Outlet 305 may be a gradually diverging conic section. In one example, outlet 305 may diverge at an angle in the range of 5° to 15°. Flow is received through inlet 302 and directed to outlet 305 via flow restriction 303 in the neck region 304 of the venturi. A diameter of outlet 305 may be the same (as shown) or slightly larger than a diameter of inlet 302. It will be appreciated that the proportions and angles of the venturi may vary with the pressures and flow rates of the primary and secondary flows.

When passing through the flow restriction, the flow velocity of the compressor recirculation flow changes, causing a corresponding change in pressure. Specifically, the flow velocity of the compressor recirculation flow may increase when passing through the neck region (as compared to the flow velocity before or after the neck region) causing a corresponding drop in pressure which is harnessed as venturi vacuum. As such, the size of the restriction and the flow velocity upstream of the restriction determines the amount of vacuum generated. Vacuum is then drawn along suction inlet 306. The drawn vacuum is used, in the particular application, to pull in low pressure EGR into the compressor recirculation passage and on to the compressor inlet. The EGR flow is then delivered to the compressor inlet may be based, at least in part, on the amount of vacuum drawn. In this way, the flow velocity of compressor recirculation flow through the venturi may determine the aspiration flow of EGR. By using compressor recirculation flow through the venturi to enhance or drive EGR flow to the compressor inlet, EGR control is enabled. In addition, the vacuum can be adjusted to enable carbureted EGR delivery.

Figure 4:
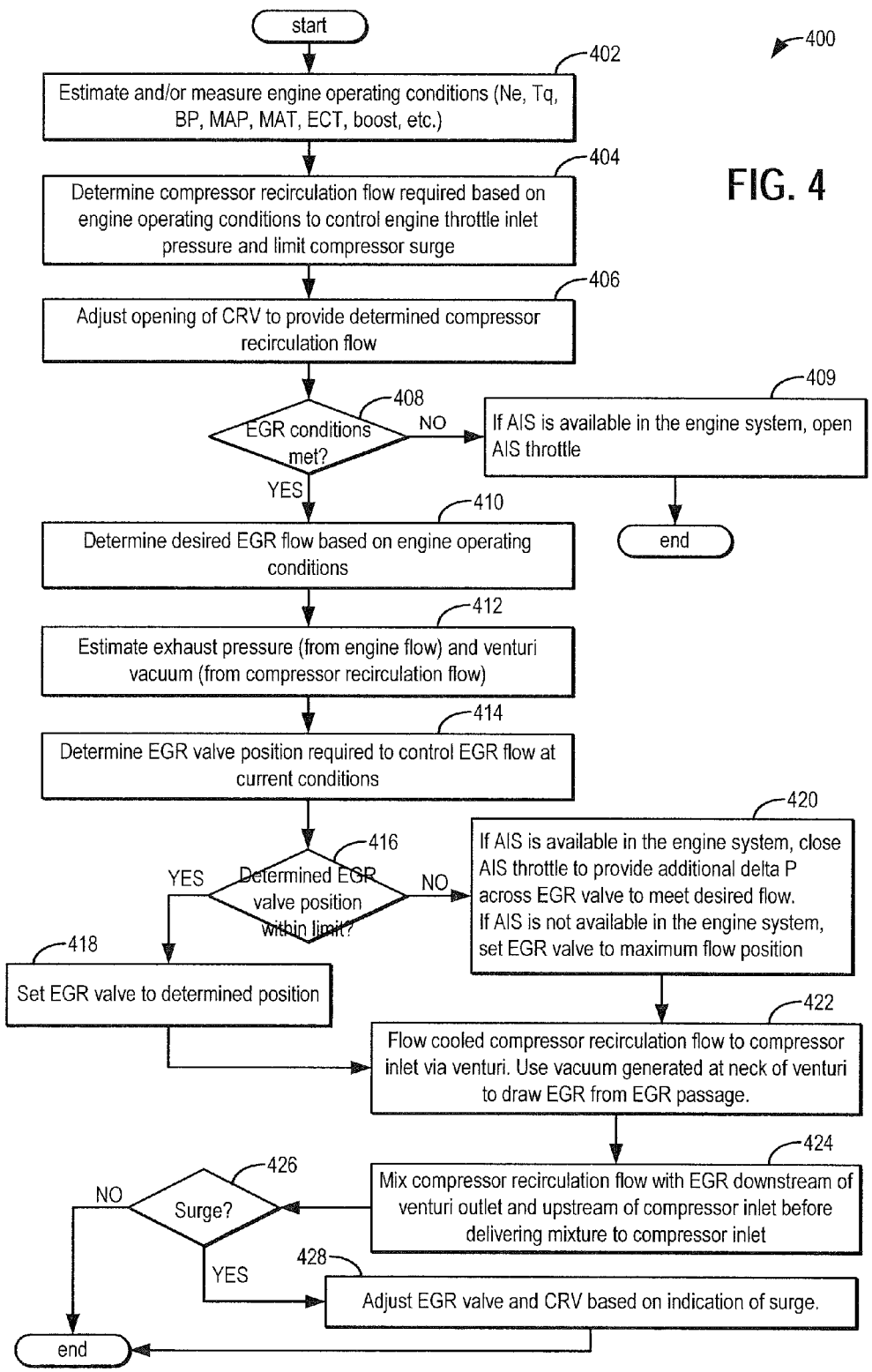
FIG. 4 shows a high level flow chart illustrating an example routine that may be implemented in the embodiment of FIG. 1 to adjust cooled compressor recirculation flow via a venturi to draw in a desired EGR flow.

Now turning to FIG. 4, an example routine 400 is shown for adjusting the position of a compressor recirculation valve to deliver cooled compressor recirculation flow from downstream of a charge air cooler to a compressor inlet via a venturi and using the vacuum generated at the venturi to draw EGR into the compressor inlet. In doing so, EGR flow control can be enhanced using the venturi vacuum. As such, the routine of FIG. 4 may be used for the engine system depicted in the embodiment of FIG. 1.

At 402, the routine includes estimating and/or measuring engine operating conditions. Operating conditions assessed may include, for example, engine speed, torque demand, boost level, MAP, MAF, engine temperature, exhaust catalyst temperature, ambient conditions (MAT, BP, ambient humidity, etc.), etc. At 404, a compressor recirculation flow required is determined based on the estimated engine operating conditions. For example, a compressor recirculation flow required to control a throttle inlet pressure and limit compressor surge may be determined. As such, the amount of compressed air recirculation required to limit compressor surge may be based on the surge margin, with the amount increased as the surge margin decreases. At 406, an opening of the compressor recirculation valve (such as CRV 72 of FIG. 1) may be adjusted based on the desired compressor recirculation flow. For example, as the compressor recirculation flow desired to limit surge increases, an opening of CRV 72 may be increased. As elaborated at FIG. 1, the CRV may be positioned in a compressor recirculation passage coupling an outlet of a charge air cooler to the compressor inlet. Thus, by varying the opening of CRV 72, an amount of cooled compressor recirculation flow recirculated to the compressor inlet can be varied. Further, since the CRV is located in the compressor recirculation passage upstream of an inlet of the venturi, the variation in the opening of CRV, and the consequent variation in the compressor recirculation flow passing through the venturi, may affect the amount of venturi vacuum generated.

At 408, it may be determined if EGR conditions are present. That is, it may be determined if conditions are conducive for enabling EGR. In one example, EGR may be enabled at specific engine speed-load conditions, such as at high engine speed-load conditions, and when operating with high boost levels.

If EGR enabling conditions are not met, then at 409, the routine includes maintaining an EGR valve (such as EGR valve 52 of FIG. 1) closed. In addition, if the engine system includes an AIS throttle upstream of the compressor, the throttle may be maintained open so as not to restrict airflow to the engine.

If EGR enabling conditions are met, then at 410, the routine includes determining an EGR flow desired based on engine operating conditions. This includes determining an amount of EGR desired as well as an EGR flow (that is, a rate at which EGR is to be delivered to the engine intake, the EGR flow determined as total EGR amount divided by total air flow amount). The EGR flow may be based on engine operating conditions such as exhaust emissions, engine temperature, etc. As such, the EGR may include low pressure EGR drawn from downstream of an exhaust turbine, through an EGR passage including an EGR valve, into the engine intake upstream of an intake compressor (e.g., at the compressor inlet). As shown at FIG. 1, the EGR passage may be coupled to the compressor recirculation passage at the venturi with each of the EGR valve and the CRV positioned (in their respective passages) upstream of an inlet of the venturi. As discussed below, by adjusting an opening of the EGR valve, and based on a pressure difference across the EGR passage, an amount of EGR deliverable to the engine intake may be varied. In addition, by using at least some venturi vacuum, the EGR flow drawn in can be enhanced. For example, a higher EGR flow can be delivered to the engine intake for a given EGR valve opening using assistance from the venturi vacuum. Alternatively, a given amount of EGR can be delivered at a smaller opening of the EGR valve by using assistance from the venturi vacuum.

At 412, the routine includes estimating an exhaust pressure from engine flow. In addition, a venturi vacuum level may be estimated from the compressor recirculation flow. Specifically, based on engine airflow conditions, an exhaust pressure upstream of an inlet of the EGR passage may be determined while based on the compressor recirculation flow passing through the venturi, a vacuum drawn at the venturi is determined. As such, the pressure differential (delta P) across the EGR passage, which is determined in part by the exhaust pressure, affects the EGR flow available with the EGR flow available increased as the pressure differential increases (when the exhaust pressure increases). EGR flow can be further enhanced using the venturi vacuum. That is, in the presence of a smaller delta P, a higher EGR flow can be enabled using assistance from the venturi vacuum than would otherwise be possible. Since the venturi vacuum is directly proportional to the amount of compressor recirculation flow passing through the venturi, the controller can estimate the venturi vacuum available (and the corresponding enhancement in EGR flow availability) based on the compressor recirculation flow determined at 404-406.

At 414, the controller may determine an EGR valve opening required to control the EGR flow at the current conditions. Specifically, an EGR valve opening required to provide EGR at the desired EGR flow, based on the exhaust pressure and available venturi vacuum may be determined. As such, for a given desired EGR flow, a larger EGR valve opening may be required if the exhaust pressure and/or venturi vacuum available is lower, while a smaller EGR valve opening may be required if the exhaust pressure and/or venturi vacuum available is higher. Thus, based on the exhaust pressure and venturi vacuum available, the controller may determine the EGR valve opening required to deliver EGR to the engine at the desired EGR flow rate. In the present example, the EGR valve may also be a continuously variable valve whose position is variable from a fully-open position to a fully-closed position and any position there-between.

At 416, it may be determined if the EGR valve position required is within a valve position limit. That is, it may be determined if the desired EGR flow is reachable with the available delta P and venturi vacuum. For example, if the EGR valve opening required to provide the desired EGR flow level is 90% (that is, within the maximum opening limit (100%) of the EGR valve), then it may be determined that the EGR flow level desired is reachable with the current exhaust pressure and the current venturi vacuum. In contrast, if the EGR valve opening required to provide the desired EGR flow level is 110% (that is, outside the maximum opening limit of the EGR valve), then it may be determined that the EGR flow level desired is not reachable with the current exhaust pressure and the current venturi vacuum, and that additional assistance is required to provide EGR at the desired flow rate.

If the EGR valve position required to provide the desired EGR flow rate is within the valve position limit, then at 418, the routine includes setting the EGR valve to the determined position. This may include, for example, adjusting a duty cycle of the EGR valve to set the EGR valve to the desired setting. If the EGR valve position required is outside of the valve position limit, then at 420, the routine includes, if an air intake system (AIS) throttle is available upstream of the compressor, closing the AIS throttle (or decreasing an opening of the AIS throttle). By closing the AIS throttle, additional delta P is provided across the EGR valve to meet the desired EGR flow rate. Upon closing the AIS throttle, the routine may optionally return to 412 to reassess the exhaust pressure and venturi vacuum (and delta P) available and re-calculate an EGR valve position required to control the EGR flow to the desired EGR rate. As such, in view of the delta P being enhanced by the closing of the AIS throttle, the revised EGR valve position may be within the EGR valve position limit.

If the determined EGR valve position is outside the position limit and an AIS throttle is not available in the system, then at 420, the controller may set the EGR valve to a maximum flow position. For example, the EGR valve may be fully opened. While this enables the highest EGR flow possible under the current conditions to be provided, the EGR flow provided may however be less than the desired EGR flow.

Upon setting the EGR valve to the determined positions at 418 or 420, the routine proceeds to 422 wherein the routine includes recirculating an amount of (cooled) compressed air from downstream of a CAC to the compressor inlet via a venturi positioned in the compressor recirculation passage. As such, the CRV may be coupled downstream of the CAC and upstream of an inlet of the venturi, substantially near a junction of the compressor recirculation passage and the CAC outlet. By flowing the compressor recirculation flow via the venturi, the change in flow velocity through the venturi can be advantageously harnessed to generate vacuum at the neck of the venturi. The amount of compressor recirculation flow delivered through the venturi may be based on the opening of the CRV and may correspond to the amount of compressor recirculation flow required to control a throttle inlet pressure and limit compressor surge, as previously determined at 404-406. The routine further includes, at 422, using the vacuum generated at the neck of the venturi to draw EGR from the EGR passage into the compressor recirculation passage, and from there into the compressor inlet. As such, the EGR passage may be coupled to the compressor recirculation passage at the venturi or at a location immediately upstream of the venturi (e.g., at an inlet of the venturi).

At 424, the routine includes mixing the drawn EGR with the compressor recirculation flow at the venturi and upstream of the compressor inlet. The mixture may then be delivered to the engine intake via the compressor inlet. In the present example, the EGR may be drawn into the venturi as the compressor recirculation flow passes through the venturi, allowing for sufficient mixing and homogenization of the EGR and the compressor recirculation flow as they move towards the compressor inlet.

At 426, it may be determined if there is an indication of surge. As such, if there is no indication of surge, the routine may end. In one example, surge may occur during an operator pedal tip-out due to a sudden closure of the main (post compressor) air intake throttle responsive to the sudden drop in engine airflow demand. This leads to a small pressure differential across the compressor. The controller may use a compressor pressure ratio map to determine if the compressor flow rate is within or beyond a surge limit (e.g., hard surge limit or soft surge limit) of the compressor. In response to an indication of surge, an opening of each of the CRV and the EGR valve may be adjusted. In the present example, with reference to an engine system embodiment having a single CRV (see FIG. 1, for example), this may include increasing an opening of the CRV to immediately reduce boost pressure downstream of the compressor outlet. In one example, the CRV may be moved to a fully open position to enable maximum compressor recirculation flow through the passage. By immediately dumping boost pressure from the compressor outlet to the compressor inlet by fully opening the CRV, a pressure difference across the compressor can be increased, improving forward flow through the compressor. Additionally, while fully opening the CRV, an opening of the EGR valve may be correspondingly decreased (in view of the additional venturi vacuum available) to maintain the EGR flow rate. Alternatively, while the opening of the CRV is increased, the EGR valve may be closed to temporarily stop providing EGR until surge conditions are over.

It will be appreciated that during CRV and EGR valve adjustments performed in the routine of FIG. 4, an intake throttle position (located downstream of the compressor) may be adjusted based on the CRV and EGR valve adjustments to maintain a desired engine airflow. For example, the main engine throttle may be set to reach a desired engine flow. Changes in throttle inlet pressure and temperature may lead to corresponding adjustments to the throttle angle to achieve the desired flow.

In this way, the controller may provide a demanded EGR flow by adjusting an EGR valve opening based on a pressure differential across an EGR passage, the pressure differential based on each of an exhaust pressure generated by engine flow and a venturi vacuum generated by compressor recirculation flow through a venturi. The EGR passage and a compressor recirculation passage may be coupled at the venturi with each of the EGR valve and a compressor recirculation valve coupled upstream of an inlet of the venturi. The adjusting may include, decreasing the EGR valve opening to provide the demanded EGR flow as the venturi vacuum generated by the compressor recirculation flow through the venturi increases, or decreasing the EGR valve opening to provide the demanded EGR flow as the exhaust pressure generated by the engine flow increases.

The adjusting may be further based on an opening limit of the EGR valve. Thus, the controller may estimate an EGR valve opening required to provide a demanded EGR flow based on each of an exhaust pressure generated by engine flow and a venturi vacuum generated by compressor recirculation flow through a venturi, wherein the engine flow is based on engine operating conditions including torque demand, and wherein the compressor recirculation flow through the venturi is based on engine operating conditions including a surge margin. During a first condition where the estimated EGR valve opening required is within an EGR valve opening limit, the EGR valve may be opened to the estimated position and low pressure EGR may be drawn into a compressor inlet using the exhaust pressure and the venturi vacuum. In comparison, during a second condition where the estimated EGR valve opening required is outside the EGR valve opening limit, the EGR valve may be opened to, and held at, the EGR valve opening limit, and low pressure EGR may be drawn into the compressor inlet using the available exhaust pressure and venturi vacuum. Additionally, if available, an air intake throttle positioned upstream of the compressor inlet may be closed to increase a pressure differential across the EGR passage.

In another example, an engine system comprises an engine including an intake and an exhaust, a turbocharger including an exhaust turbine driven by an intake compressor, a charge air cooler coupled downstream of the compressor, and a compressor recirculation passage including a first valve and a venturi, the passage coupling an outlet of the charge air cooler to an inlet of the compressor, the venturi positioned downstream of the first valve in the passage. The system may further comprise an EGR passage including a second valve for recirculating exhaust residuals to the compressor recirculation passage, downstream of the venturi. A controller may be configured with computer readable instructions for adjusting an opening of the first valve based on a surge limit of the compressor, and adjusting an opening of the second valve based on the opening of the first valve to provide a desired EGR flow. Herein, each of the first and second valves may be continuously variable valves, and an opening of the second valve may be further based on an exhaust pressure upstream of an inlet of the EGR passage. The adjusting may include increasing an opening of the first valve as the compressor moves closer to the surge limit, the increasing an opening of the first valve generating increased vacuum at the venturi, and increasing an opening of the second valve based on the amount of vacuum venturi to draw in EGR from the EGR passage towards the compressor inlet, the EGR mixed with the compressor recirculation flow upstream of the compressor inlet.

In this way, compressor recirculation flow may be adjusted to limit surge while the delivery of compressor recirculation flow through a venturi is advantageously harnessed to generate vacuum for drawing EGR. By adjusting the opening of an EGR valve based on the amount of compressor recirculation flow induced vacuum available, a desired EGR flow can be provided without requiring additional adjustments to a compressor inlet pressure. For example, when more compressor recirculation flow is available, the desired EGR flow can be provided with a smaller EGR valve opening. By also adjusting an intake throttle based on the EGR flow demand and the venturi vacuum available, EGR flow can be further enhanced. By using the compressor recirculation flow to both limit surge and enhance EGR flow, boost control and EGR control can be synergized. An example CRV and EGR valve adjustment for enabling boost control and EGR control is elaborated with reference to FIG. 6.

Figure 6:
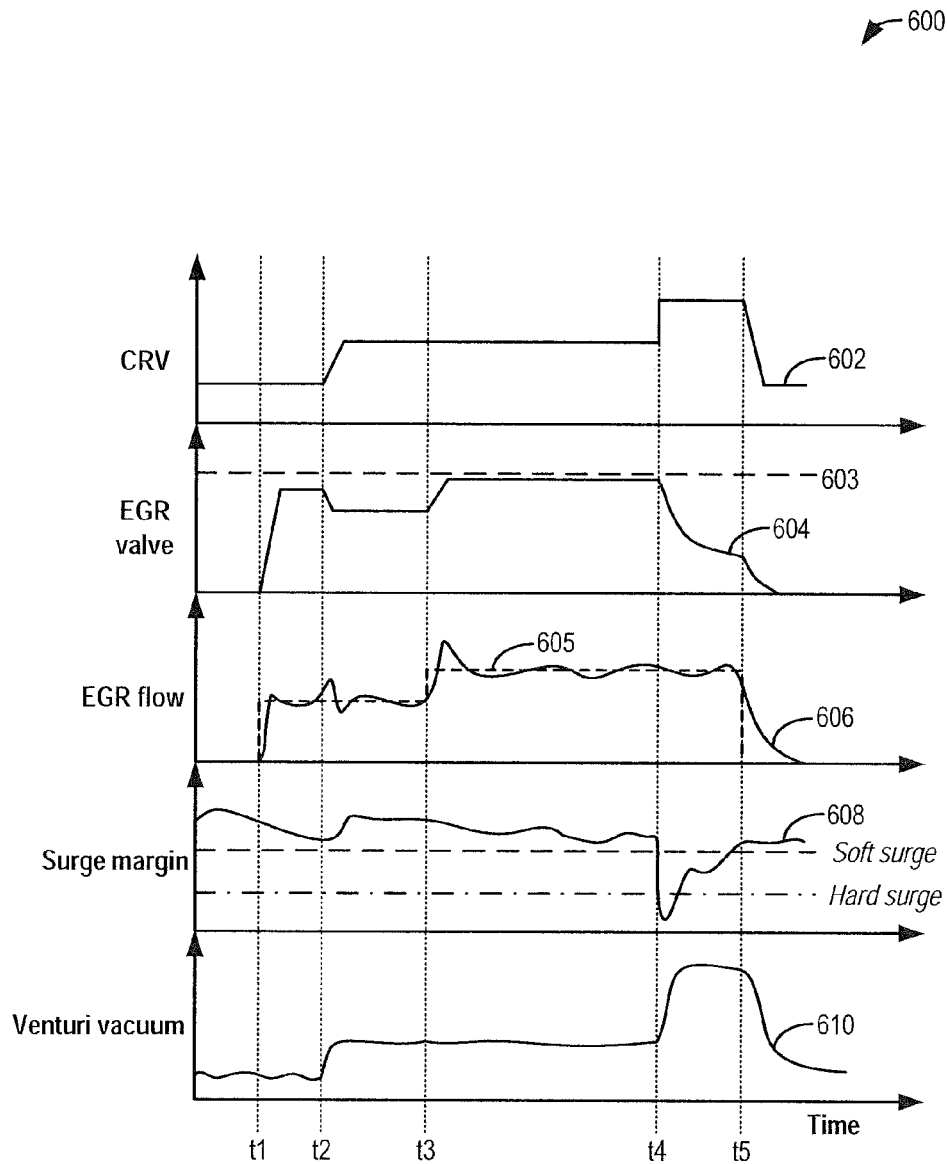
FIG. 6 shows an example compressor recirculation flow adjustment that may be used to provide EGR in the embodiment of FIG. 1, according to the present disclosure.

Now turning to FIG. 6, an example use of compressor recirculation flow to enhance the flow of LP-EGR is shown at map 600. Specifically, map 600 depicts the opening of a CRV at plot 602, the opening of an EGR valve at plot 604, an EGR flow at plot 606, a margin to surge at plot 608, and a venturi vacuum drawn due to compressor recirculation flow at plot 610.

Prior to t1, the engine may be operating boosted with the CRV partially open (plot 602). The opening of the CRV may be adjusted (e.g., to a partially-open position) based on engine operating conditions to provide a desired throttle inlet pressure and a margin to surge (plot 608). The compressor recirculation flow may be delivered from downstream of a charge air cooler to a compressor inlet via a venturi. Consequently, an amount of vacuum corresponding to the compressor recirculation flow may be generated at the venturi. As such, prior to t1, EGR conditions may not be met and no EGR flow may be required (plot 606). Accordingly, the EGR valve may be held closed (plot 604). In the example of FIG. 6, each of the CRV and the EGR valve may be continuously variable valves whose position is variable to any position from a fully-open position to a fully-closed position.

At t1, EGR conditions may be met. Further a desired EGR flow (depicted by dashed line 605) may be determined based on the engine operating conditions. An EGR valve opening required to provide the desired EGR flow rate may be determined based on the exhaust pressure available (as determined from engine flow conditions) as well as the venturi vacuum available (plot 610). In particular, the EGR flow available may be affected by the pressure difference across the EGR passage with the EGR flow increased as the exhaust pressure at the inlet of the EGR passage increases and an intake pressure at the outlet of the EGR passage decreases. In addition, the presence of compressor recirculation flow induced venturi vacuum may enhance the EGR flow capability. Thus, for a given exhaust pressure, as the venturi vacuum available increases, a smaller EGR valve opening may be required to deliver the same EGR flow. In the depicted example, the EGR valve opening required is within an EGR valve opening limit 603. Thus, at t1, the EGR valve may be opened to the determined valve opening (plot 604) to provide the desired EGR flow (plot 606).

Between t1 and t2, a margin to compressor surge may decrease and the compressor may move closer to a soft surge limit. Thus, to improve the surge margin, an opening of the CRV may be increased. As such, this results in a corresponding increase in the amount of venturi vacuum available for drawing in EGR while the exhaust pressure remains substantially the same. Therefore, to provide the same desired EGR flow level, an opening of the EGR valve may be decreased based on the increase in compressor recirculation flow and increase in venturi vacuum to maintain the EGR flow level.

At t3, due to a change in engine operating conditions, the EGR flow desired may increase. In view of the higher available venturi vacuum, the EGR valve opening may be increased (e.g., slightly) at t3 to meet the revised EGR flow level. The engine may then continue to operate with compressor recirculation flow with the CRV opening adjusted for surge control and EGR valve opening adjusted based on the compressor recirculation flow for EGR control.

At t4, an indication of surge may be received. In one example, the indication of surge at t4 may be responsive to an operator pedal tip-out event. The indication of surge may include a drop in the surge margin and the temporary transition of a compressor pressure ratio into a hard surge region (as defined by the region below the hard surge limit, depicted as a dashed and dotted line). In response to the indication of surge, the CRV opening may be further increased. For example, the CRV may be temporarily transitioned to a fully-open position. The CRV may then be held in the fully open position at least until the indication of surge has subsided (e.g., at t5). For example, the valve may be held open until the compressor pressure ratio has at least moved out of the hard surge region and into a soft surge region (as defined by the region between the hard surge limit and the soft surge limit, the latter depicted as a dashed line).

Between t4 and t5, due to the opening of the CRV and the consequent increase in compressor recirculation flow, the amount of venturi vacuum generated may increase. Thus, to maintain the EGR flow level at the desired level, the EGR valve opening may be correspondingly decreased. This allows for concurrent surge and EGR control. At t5, EGR conditions may end and the EGR valve may be closed. In addition, compressor recirculation flow may be decreased (by decreasing an opening of the CRV) as the margin to surge improves.

It will be appreciated that in some embodiments, the EGR valve may be closed in response to the indication of surge due to no further EGR being required during the surge condition.

In this way, a method for enabling surge control and EGR control is provided by adjusting opening of a first valve (the CRV) based on a surge limit to draw compressor recirculation flow from downstream of a charge air cooler to a compressor inlet via a venturi; and adjusting an opening of a second valve (the EGR valve) based on vacuum drawn at the venturi to draw EGR into the compressor inlet. Herein, each of the first and second valves are continuously variable valves, the first valve coupled upstream of an inlet of the venturi in a compressor recirculation passage, the second valve coupled upstream of the inlet of the venturi in an EGR passage, the EGR passage coupled to the compressor recirculation passage at the venturi. The method further enables vacuum to be drawn at the venturi via the compressor recirculation flow, wherein an amount of vacuum drawn at the venturi is based on the opening of the first valve. The adjusting an opening of the second valve includes adjusting the opening of the second valve based on the vacuum demand to draw EGR into the compressor inlet at a flow rate determined based on engine operating conditions. The opening of the second valve is further adjusted based on exhaust pressure. For example, the adjusting an opening of the first valve includes increasing an opening of the first valve as a margin to the surge limit decreases, while adjusting the opening of the second valve includes, decreasing an opening of the EGR valve as the amount of vacuum drawn at the venturi increases to draw EGR into the compressor inlet at the determined flow rate. By mixing the compressor recirculation flow with the drawn EGR at the venturi before delivering the mixture to the compressor inlet, venturi vacuum is advantageously used to enhance EGR flow.

Figure 5:
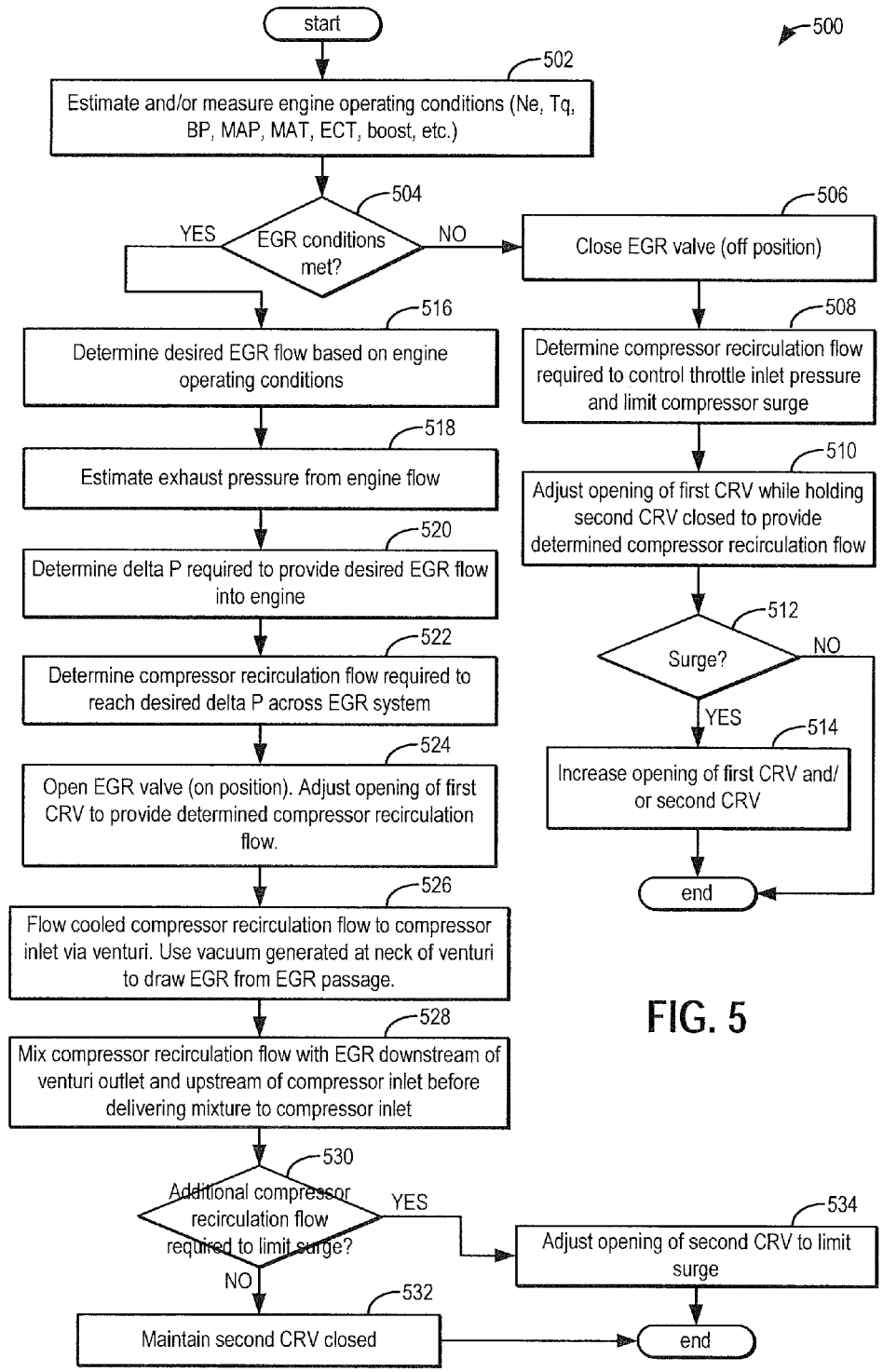
FIG. 5 shows a high level flow chart illustrating an example routine that may be implemented in the embodiment of FIG. 2 to adjust cooled compressor recirculation flow via a venturi to draw in a desired EGR flow.

Now turning to FIG. 5, an example routine 500 is shown for adjusting the position of a first compressor recirculation valve to vary an amount of compressor recirculation flow delivered to the compressor inlet via a venturi. In doing so, EGR control can be enabled. The position of a second compressor recirculation valve may then be adjusted to enable compressor surge control. As such, the routine of FIG. 5 may be used for the engine system depicted in the embodiment of FIG. 2. The method enables an amount of compressor recirculation flow delivered from downstream of a charge air cooler to a compressor inlet via a venturi to be adjusted based on EGR demand.

At 502, as at 402, the routine includes estimating and/or measuring engine operating conditions. The engine operating conditions estimated may include, for example, engine speed, torque demand, boost level, MAP, MAF, engine temperature, exhaust catalyst temperature, ambient conditions (MAT, BP, ambient humidity, etc.), etc.

At 504, as at 408, based on the engine operating conditions, it may be determined if EGR conditions are present. If EGR enabling conditions are not met, then at 506, the routine includes closing an EGR valve. In the depicted embodiment, the EGR valve may be an on/off valve and closing the valve may include shifting the valve to an off position. Upon closing the EGR valve, at 508, the routine includes determining an amount of compressor recirculation flow required based on the estimated engine operating conditions. For example, a compressor recirculation flow required to control a throttle inlet pressure and limit compressor surge may be determined. In one example, as a surge margin decreases, an amount of compressor recirculation flow needed for surge control may increase.

At 510, an opening of a first compressor recirculation valve coupled in a first compressor recirculation passage (such as CRV 72 in passage 70 of FIG. 2) may be adjusted based on the desired compressor recirculation flow. For example, as the desired compressor recirculation flow increases, an opening of CRV 72 may be increased. In other examples, an opening of each of the first compressor recirculation valve 72 and a second compressor recirculation valve coupled in a second compressor recirculation passage, positioned parallel to the first compressor recirculation passage (such as CRV 82 in passage 80 of FIG. 2), may be adjusted to provide the desired compressor recirculation flow. For example, each of CRV 72 and 82 may be opened slightly to provide the desired compressor recirculation flow (during conditions when EGR flow demand is lower than surge flow demand). Herein, the primary use of CRV 72 is managing EGR flow and CRV 82 is for any additional flow needed to manage surge. Each of the first and second compressor recirculation valves may be continuously variable valves whose position is variable from a fully-open position to a fully-closed position and any position there-between.

At 512, it may be determined if there is an indication of surge. As such, even with the compressor recirculation flow adjusted to limit surge, actual compressor surge may occur, for example, due to a sudden drop in airflow demand during an operator pedal tip-out. In response to the indication of surge, at 514, the opening of the first and/or the second CRV may be increased. For example, one or more of CRV 72 and CRV 82 may be shifted to a fully open position. As such, if there is no indication of surge, the routine may end with the EGR valve maintained closed and the first and second CRV maintained in a position to enable the desired amount of compressor recirculation flow.

Returning to 504, if EGR conditions are met, then at 516, the routine includes determining an EGR flow desired based on engine operating conditions. This includes determining an amount of EGR desired as well as an EGR flow (that is, a rate at which EGR is to be delivered to the engine intake, the EGR flow determined as total EGR amount divided by total air flow amount). The EGR flow may be based on engine operating conditions such as exhaust emissions, engine temperature, etc. As such, the EGR may include low pressure EGR drawn from downstream of an exhaust turbine into the engine intake upstream of an intake compressor (e.g., at the compressor inlet) through an EGR passage including an EGR valve. As depicted at the FIG. 2, the EGR passage may be coupled to the first compressor recirculation passage at the venturi, the EGR passage not coupled to the second compressor recirculation passage that does not include a venturi.

At 518, the routine includes estimating an exhaust pressure from the engine flow. At 520, the routine includes determining a pressure differential (or delta P) required across the EGR valve to provide the desired EGR flow to the engine. As such, the pressure differential (delta P) across the EGR passage, which is determined in part by the exhaust pressure, affects the EGR flow available with the EGR flow available increased as the pressure differential increases.

At 522, the routine includes determining the compressor recirculation flow required to reach the desired pressure differential or delta P. The inventors have recognized that compressor recirculation flow through a venturi can be used to generate venturi vacuum which can be used to enhance the delta P available across the EGR passage for driving EGR flow. Thus, in the presence of a smaller exhaust pressure, a higher delta P can be achieved by increasing the compressor recirculation flow through the venturi. In doing so, the delta P and therefore the EGR flow can be enhanced using the venturi vacuum. Since the venturi vacuum is directly proportional to the amount of compressor recirculation flow passing through the venturi, the controller can estimate the venturi vacuum required in addition to the exhaust pressure to achieve the desired delta P, and then compute an amount of compressor recirculation flow required to generate the venturi vacuum. Thus, the controller can adjust the amount of compressor recirculation flow delivered through the venturi in the first recirculation passage to provide sufficient venturi vacuum for drawing in the desired EGR flow.

At 524, the routine includes opening the EGR valve to enable EGR to drawn out of the EGR passage. In the depicted embodiment, the EGR valve may be an on/off valve and opening the valve may include shifting the valve to an on position. By opening the EGR valve, EGR is enabled, the EGR flow then adjusted by varying the opening of the first CRV. Also at 524, the routine includes adjusting the opening of the first CRV in the first compressor recirculation passage (CRV 70 in passage 70) to provide the determined compressor recirculation flow. In other words, the opening of the first CRV is adjusted (based on the available exhaust pressure and the desired delta P) to provide a compressor recirculation flow that generates sufficient venturi vacuum to enable the desired EGR flow to be achieved. For example, at a given exhaust pressure, as the desired EGR flow increases, while holding the EGR valve open, an opening of the first CRV may be increased to increase an amount of venturi vacuum available for drawing in the EGR.

At 526, the routine includes recirculating the determined amount of (cooled) compressed air from downstream of a CAC to the compressor inlet via a venturi positioned in the first compressor recirculation passage. As such, the first CRV may be coupled downstream of the CAC and upstream of an inlet of the venturi, substantially near a junction of the compressor recirculation passage and the CAC outlet in the first compressor recirculation passage. By flowing the determined amount of compressor recirculation flow via the venturi, the change in flow velocity through the venturi can be advantageously harnessed to generate vacuum at the neck of the venturi. The opening of the CRV and the amount of compressor recirculation flow delivered through the venturi may be adjusted based on the available exhaust pressure to provide the desired EGR flow. The routine further includes, at 526, using the vacuum generated at the neck of the venturi to draw EGR from the EGR passage into the compressor recirculation passage, and from there into the compressor inlet. As such, the EGR passage may be coupled to the first compressor recirculation passage at the venturi, or at a location immediately upstream of the venturi (e.g., at an inlet of the venturi). Specifically, the EGR valve may be positioned at the junction of the EGR passage and the first compressor recirculation passage.

At 528, the routine includes mixing the drawn EGR with the compressor recirculation flow at the venturi in the first compressor recirculation passage and upstream of the compressor inlet. The mixture may then be delivered to the engine intake via the compressor inlet. In the present example, the low pressure EGR may be drawn into the venturi as the compressor recirculation flow passes through the venturi, allowing for sufficient mixing and homogenization of the EGR and the compressor recirculation flow as they move towards the compressor inlet.

At 530, it may be determined if any additional compressor recirculation flow is required to limit surge. For example, based on the current conditions, a margin to compressor surge may be mapped and it may be determined if additional compressor recirculation flow is required to move further away from a surge limit. If yes, then at 534, an opening of the second compressor recirculation valve in the second compressor recirculation passage may be increased (while the opening of the first compressor recirculation valve in the first compressor recirculation passage is maintained to provide the compressor recirculation flow required to enable the desired EGR flow). For example, while the opening of a first CRV (such as CRV 72 of FIG. 2) is maintained for EGR flow control, the opening of the second CRV (such as CRV 82 of FIG. 2) is increased for surge control. In one example, surge may be limited by fully opening the second CRV. As such, if no addition compressor recirculation flow is required to address the surge concern, then at 532, the second CRV is maintained closed. Herein, when the EGR valve is on, CRV 72 is modulated to control EGR. If this does not produce enough flow through the compressor to limit surge, then CRV

82 provides the difference. In other words, the valve control can be thought of as sequential control of the CRVs. Thus, the first CRV is used to provide EGR control (by adjusting an amount of compressor recirculation flow through the venturi) while the second CRV is used for boost and surge control (by adjusting an amount of boost pressure dumped from downstream of the CAC to the compressor inlet). A nominal valve position of the second CRV may be resumed once the indication of surge has subsided.

It will be appreciated that during CRV and EGR valve adjustments performed in the routines of FIG. 5, an intake throttle position may be adjusted based on the CRV and EGR valve adjustments to maintain a desired engine airflow. For example, the main engine throttle may be set to reach a desired engine flow. Changes in throttle inlet pressure and temperature may lead to corresponding adjustments to the throttle angle to achieve the desired flow.

In this way, a controller may adjust compressor recirculation flow through a first compressor recirculation passage via a venturi based on EGR flow demand while adjusting compressor recirculation flow through a second compressor recirculation passage based on surge. The controller may then open an EGR valve and draw EGR into a compressor inlet from an EGR passage using vacuum generated at the venturi. Herein, the EGR valve may be an on/off valve mounted on the venturi and opening the EGR valve may include shifting the EGR valve to an on position. The EGR passage may be coupled to the first passage at the venturi, the EGR passage not coupled to the second passage, and the compressor recirculation flow through the second passage not being via a venturi. To adjust compressor recirculation flow through the first passage, the controller may adjust the opening of a first continuously variable compressor recirculation valve based on the EGR flow demand, while adjusting the opening of a second continuously variable compressor recirculation valve based on surge to adjusting the compressor recirculation flow through the second passage. For example, an opening of the second valve may be increased as an indication of surge increases, and an opening of the first valve may be increased as the EGR flow demand increases. The controller may then mix the drawn EGR with the compressor recirculation flow upstream of the compressor inlet in the first passage.

For example, a controller may provide a demanded EGR flow by opening an EGR valve in an EGR passage and adjusting an opening of a first compressor recirculation valve in a first compressor recirculation passage coupled to the EGR passage to provide a desired pressure differential across the EGR passage. Specifically, the opening of the first CRV may be adjusted based on a difference between an available pressure differential across the EGR passage (which is estimated from exhaust pressure or engine flow) and the pressure differential desired to provide the demanded EGR flow. By adjusting the CRV opening based on the desired pressure differential (or desired EGR flow), compressor recirculation flow can be delivered via a venturi and an amount of venturi vacuum required to enhance the available pressure differential and meet the EGR flow demand can be generated using the compressor recirculation flow through a venturi. Thus, for a given exhaust pressure, as the EGR flow demand increases, the need for a higher pressure differential across the EGR passage can be met by increasing compressor recirculation flow through the venturi and thereby generating more venturi vacuum.

Thus, during a first EGR condition, when exhaust pressure is lower (and therefore when a pressure differential across an EGR passage is lower), an EGR flow demand can be met by increasing compressor recirculation flow through a venturi to a higher level, by shifting the first CRV in the first compressor recirculation passage to a relatively larger degree of opening. In comparison, during a second EGR condition, when exhaust pressure is higher (and therefore when a pressure differential across the EGR passage is higher), the given EGR flow demand can be met by increasing compressor recirculation flow through the venturi to a lower level, by shifting the first CRV in the first compressor recirculation passage to a relatively smaller degree of opening.

Likewise, during a first condition, when a surge margin is higher, an opening of a first CRV in a first compressor recirculation passage including a venturi may be adjusted based on EGR flow demand while a second CRV in a second compressor recirculation passage not including a venturi is held closed. Then, during a second condition, when the surge margin is smaller, the opening of the first CRV in the first compressor recirculation passage may be maintained based on the EGR flow demand while the second CRV in the second compressor recirculation passage is opened, an opening of the second CRV increased as the margin to a surge limit decreases.

In this way, compressor recirculation flow through a first compressor recirculation passage including a venturi and coupled to an EGR passage can be adjusted based on EGR requirements to enable EGR control. Specifically, compressor recirculation flow through a venturi in a compressor recirculation passage coupled to an EGR passage may be adjusted based on an EGR flow demand and further based on an available exhaust pressure to provide a desired pressure differential across the EGR passage. By flowing the compressor recirculation flow through the venturi, the pressure differential available for drawing EGR can be enhanced. As such, this allows higher EGR flow rates to be enabled at lower exhaust pressures. Additionally, compressor recirculation flow through a second, different compressor recirculation passage (the passage not including a venturi and not coupled to an EGR passage) can be adjusted based on surge limits to enable surge control.

Figure 7:
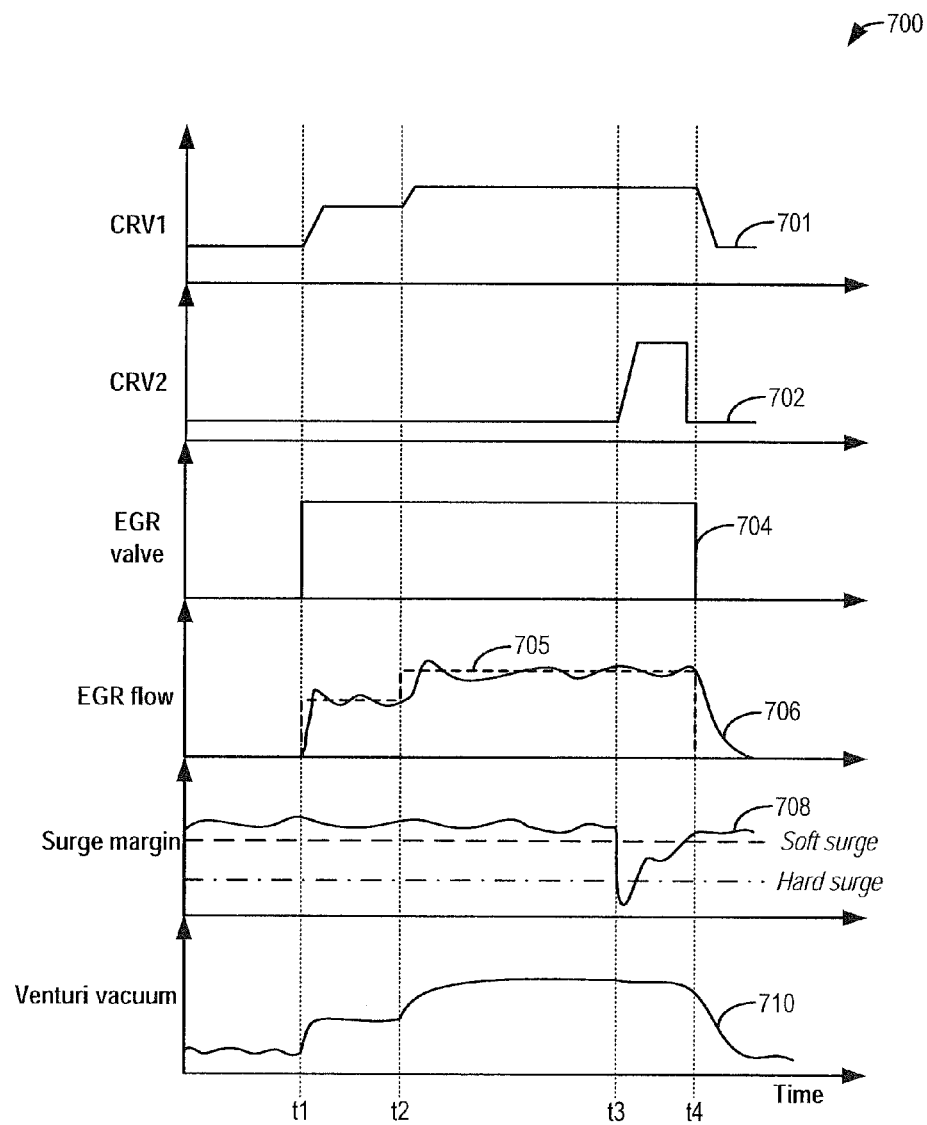
FIG. 7 shows an example compressor recirculation flow adjustment that may be used to provide EGR in the embodiment of FIG. 2, according to the present disclosure.

Now turning to FIG. 7, an alternate example use of compressor recirculation flow to enhance the flow of LP-EGR is shown at map 700. Specifically, FIG. 7 depicts the use of compressor recirculation flow through a first compressor recirculation passage for EGR control while using compressor recirculation flow through a second compressor recirculation passage for boost and surge control. Map 700 depicts the opening of a first CRV (CRV1) in the first compressor recirculation passage at plot 701, the opening of a second CRV (CRV2) in the second compressor recirculation passage at plot 702, opening of an EGR valve at plot 704, an EGR flow at plot 706, a margin to surge at plot 708, and a venturi vacuum drawn due to compressor recirculation flow at plot 710.

Prior to t1, the engine may be operating boosted with the first CRV (CRV1) in the first compressor recirculation passage partially open (plot 701) while the second CRV (CRV2) in the second compressor recirculation passage is held closed (plot 702). As such, the first and second compressor recirculation passages may be positioned in parallel to each other and both may be configured to deliver cooled compressed air from downstream of a CAC to the compressor inlet with compressor recirculation flow through the first passage travelling through a venturi and the compressor recirculation flow through the second passage not travelling through a venturi.

The opening of CRV1 may be adjusted (e.g., to a partially-open position) prior to t1 based on engine operating conditions to provide a desired throttle inlet pressure and a margin to surge (plot 708). As such, since the compressor recirculation flow is delivered along the first compressor recirculation passage via a venturi, an amount of vacuum corresponding to the compressor recirculation flow may be generated at the venturi (plot 710). Prior to t1, EGR conditions may not be met and no EGR flow may be required (plot 705, dashed lines). Accordingly, the EGR valve may be held closed (plot 704). In the example of FIG. 7, each of the first and second CRV may be continuously variable valves whose position is variable to any position from a fully-open position to a fully-closed position. In comparison, the EGR valve may be an on/off valve. Thus, prior to t1, the EGR valve may be in the off position.

At t1, EGR conditions may be met. Further a desired EGR flow (depicted by dashed line 705) may be determined based on the engine operating conditions. To enable EGR to be delivered, the EGR valve (herein an on/off valve) may be opened by shifting the valve to an on position. A pressure differential across the EGR passage required to provide the desired EGR flow (plot 705) may be determined. Then, based on the amount of exhaust pressure available, an amount venturi vacuum required to provide the desired EGR flow is then determined. An opening of CRV1 is then adjusted to provide sufficient venturi vacuum to provide the desired EGR flow. In the depicted example, in response to the increase EGR demand at t1, an opening of CRV1 is increased. At the same time, CRV2 is maintained closed. The consequent increase in compressor recirculation flow through the first compressor recirculation passage induces an increase in venturi vacuum which is then used to draw in the EGR at the desired EGR flow rate.

At t2, due to a change in engine operating conditions, the EGR flow desired may increase. To meet the higher EGR flow, a higher venturi vacuum level may be required. Thus, to meet the higher EGR flow demand, at t2, an opening of CRV1 is increased to increase compressor recirculation flow through the venturi in the first passage, with a corresponding rise in venturi vacuum that is then used to draw in the EGR flow. The engine may then continue to operate with compressor recirculation flow and CRV opening in the first compressor recirculation passage adjusted for EGR control.

At t3, an indication of surge may be received. In one example, the indication of surge at t3 may be responsive to an operator pedal tip-out event. The indication of surge may include a drop in the surge margin and the temporary transition of a compressor pressure ratio into a hard surge region (as defined by the region below the hard surge limit, depicted as a dashed and dotted line). In response to the indication of surge, the opening of CRV2 may be increased. For example, CRV2 may be transitioned to a fully-open position. CRV2 may then be held in the fully open position at least until the indication of surge has subsided (just before t4). For example, the valve may be held open until the compressor pressure ratio has at least moved out of the hard surge region and into a soft surge region (as defined by the region between the hard surge limit and the soft surge limit, the latter depicted as a dashed line).

Between t3 and t4, while the opening of CRV2 is increased to enable surge control, an opening of CRV1 may be maintained to enable EGR control to continue. This allows for concurrent surge and EGR control. At t4, EGR conditions may end and the EGR valve may be closed. In addition, an opening of CRV1 may be decreased in view of the reduced demand for compressor recirculation flow induced venturi vacuum.

It will be appreciated that in some embodiments, while surge is addressed by opening CRV2, the EGR valve and CRV1 may be closed at t3 in response to further EGR being requested during the surge condition.

In this way, compressor recirculation flow through a venturi may be advantageously used to generate sufficient vacuum to draw LP-EGR into an engine intake, at a pre-compressor location. By using a vacuum-assist to draw in the EGR, the need for increased pre-compressor throttling (for sufficiently decreasing a compressor inlet pressure for drawing in the LP-EGR) is reduced. In addition, the approach enables synergistic EGR and surge control.

In one example, an engine system comprises an engine including an intake and an exhaust, a turbocharger including an exhaust turbine driven by an intake compressor, a charge air cooler coupled downstream of the compressor, a first compressor recirculation passage including a first valve and a venturi, the first passage coupling an outlet of the charge air cooler to an inlet of the compressor, the venturi positioned downstream of the first valve in the passage and a second compressor recirculation passage including a second valve, the second passage coupling the outlet of the charge air cooler to the inlet of the compressor, the second passage positioned parallel to the first passage. The engine system further includes an EGR passage including an EGR valve for recirculating exhaust residuals to the engine intake via the first compressor recirculation passage, the EGR passage coupled to the first passage at the venturi. A controller may be configured with computer readable instructions for, in response to an EGR demand, opening the EGR valve, increasing an opening of the first valve based on the EGR demand to recirculate compressed air through the venturi and generate vacuum at the venturi; and drawing EGR into the engine using the vacuum generated at the venturi. The controller may include further instructions for, in response to an indication of surge, increasing an opening of the second valve while maintaining the opening of the first valve. Herein, the opening of the first valve may be further based on exhaust pressure estimated upstream of an inlet of the EGR passage, the opening of the first valve decreased as the exhaust pressure increases. Each of the first and second valves are continuously variable valves while the EGR valve is an on/off valve.

In this way, EGR flow can be enhanced while also improving compressor surge margin. This allows EGR control and surge control to be performed concurrently and synergistically. By flowing compressor recirculation flow through a venturi or ejector, the pressure/flow energy in the compressor recirculation flow can be advantageously used to create a vacuum that draws in EGR via the Bernoulli effect at the venturi. As such, this reduces the low pressure requirement at the compressor inlet for drawing in EGR. For example, less intake throttling is required to draw in the EGR. The reduced low pressure requirement also reduces durability concerns arising from turbocharger shaft oil being drawn into the engine. By coordinating the opening of an EGR valve with the opening of a CRV, EGR can be provided at a desired EGR rate. In this way, carbureted EGR flow is provided while also improving compressor surge margins.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
recirculating an amount of compressed air from downstream of a charge air cooler to a compressor inlet through a first compressor recirculation passage via a venturi based on EGR flow demand while recirculating another amount to the compressor inlet through a second compressor recirculation passage not including a venturi based on a surge margin; and
using vacuum generated at the venturi to draw EGR into the compressor inlet.

2. The method of claim 1, wherein the EGR is low pressure EGR drawn into the compressor inlet from downstream of an exhaust turbine, through an EGR passage including an EGR valve.

3. The method of claim 2, wherein recirculating the amount of compressed air includes adjusting an opening of a first compressor recirculation valve coupled in the first compressor recirculation passage upstream of the venturi to recirculate an amount of cooled compressed air based on the EGR flow demand, and further based on a water content of the EGR.

4. The method of claim 3, further comprising mixing the drawn EGR with compressor recirculation flow at the venturi, the EGR passage coupled to only the first compressor recirculation passage at the venturi, the EGR valve positioned in the EGR passage upstream of an inlet of the venturi.

5. The method of claim 3, wherein recirculating the another amount of compressed air recirculated through the second compressor recirculation passage includes adjusting an opening of a second compressor recirculation valve coupled in the second compressor recirculation passage, the opening of the second valve increased as the surge margin decreases.

6. The method of claim 5, wherein the EGR valve is an on/off valve and wherein the EGR valve is shifted to an on position in response to the EGR flow demand.

7. The method of claim 6, wherein each of the first and second compressor recirculation valves and are continuously variable valves, and wherein each of the first compressor recirculation valve and the EGR valve are coupled upstream of an inlet of the venturi.

8. The method of claim 6, wherein the EGR flow demand is based on engine operating conditions including exhaust emissions, and wherein the opening of the first compressor recirculation valve is further adjusted based on an exhaust pressure to provide sufficient venturi vacuum to provide the EGR flow demand.

9. The method of claim 8, further comprising, in response to an indication of surge, fully opening the second compressor recirculation valve while maintaining the opening of the first compressor recirculation valve and while maintaining the EGR valve in the on position.

10. A method for an engine, comprising,
adjusting an opening of a first valve based on a surge limit and a water content of low-pressure exhaust gas recirculation (EGR) to draw compressor recirculation flow from downstream of a charge air cooler to a compressor inlet via a venturi; and
adjusting an opening of a second valve based on vacuum drawn at the venturi to draw the EGR into the compressor inlet via an EGR passage coupled to the compressor recirculation passage at the venturi.

11. The method of claim 10, wherein each of the first and second valves are continuously variable valves, the first valve coupled upstream of an inlet of the venturi in a compressor recirculation passage, the second valve coupled upstream of the inlet of the venturi in the EGR passage.

12. The method of claim 11, further comprising drawing a vacuum at the venturi via the compressor recirculation flow, wherein an amount of vacuum drawn at the venturi is based on the opening of the first valve.

13. The method of claim 12, wherein adjusting an opening of the second valve includes adjusting the opening of the second valve based on a vacuum demand to draw EGR into the compressor inlet at a flow rate determined based on engine operating conditions.

14. The method of claim 13, wherein the opening of the second valve is further adjusted based on exhaust pressure.

15. The method of claim 14, wherein adjusting the opening of the first valve includes increasing the opening of the first valve as a margin to the surge limit decreases.

16. The method of claim 15, wherein adjusting the opening of the second valve includes decreasing an opening of the EGR valve as the amount of vacuum drawn at the venturi increases to draw EGR into the compressor inlet at the determined flow rate.

17. The method of claim 16, further comprising mixing the compressor recirculation flow with the drawn EGR at the venturi before delivering the mixture to the compressor inlet.

18. An engine system, comprising:
an engine including an intake and an exhaust;
a turbocharger including an exhaust turbine driven by an intake compressor;
a charge air cooler coupled downstream of the compressor;
a first compressor recirculation passage including a first valve and a venturi, the first passage coupling an outlet of the charge air cooler to an inlet of the compressor, the venturi positioned downstream of the first valve in the first passage;
a second compressor recirculation passage including a second valve, the second passage parallel to the first passage and coupling the outlet of the charge air cooler to the inlet of the compressor;

an EGR passage including an EGR valve for recirculating exhaust residuals to the first compressor recirculation passage, downstream of the venturi; and a controller with computer readable instructions for,
adjusting an opening of the first valve based on an exhaust pressure upstream of an inlet of the EGR passage to generate venturi vacuum to provide a desired EGR flow; and adjusting an opening of the second valve based on a margin to compressor surge with the first valve open.

19. The system of claim 18, wherein each of the first and second valves are continuously variable valves, and wherein the EGR valve is an on/off valve that is shifted to an on position by the controller when EGR flow is desired.

20. The system of claim 19, wherein the adjusting includes increasing an opening of the second valve as the margin to compressor surge increases and increasing an opening of the first valve as an amount of the venturi vacuum required to draw in the desired EGR flow from the EGR passage towards the compressor inlet increases, the EGR flow mixed with the compressor recirculation flow through the first passage upstream of the compressor inlet.

* * * * *